(12) United States Patent
Lee

(10) Patent No.: US 8,508,579 B2
(45) Date of Patent: Aug. 13, 2013

(54) SYSTEM AND METHOD FOR GENERATING AND REPRODUCING 3D STEREOSCOPIC IMAGE FILE INCLUDING 2D IMAGE

(75) Inventor: Gun-Ill Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1139 days.

(21) Appl. No.: 12/206,431

(22) Filed: Sep. 8, 2008

(65) Prior Publication Data

US 2009/0066785 A1 Mar. 12, 2009

(30) Foreign Application Priority Data

Sep. 7, 2007 (KR) .................. 10-2007-0090973

(51) Int. Cl.
*H04N 13/00* (2006.01)

(52) U.S. Cl.
USPC .................. 348/42; 348/36; 348/43

(58) Field of Classification Search
USPC .................. 348/36, 42, 43
See application file for complete search history.

(56) References Cited

U.S. PATENT DOCUMENTS

| | | | | |
|---|---|---|---|---|
| 2005/0259147 A1* | 11/2005 | Nam et al. | ............. | 348/43 |
| 2007/0167702 A1* | 7/2007 | Hasser et al. | ............. | 600/407 |
| 2008/0158345 A1* | 7/2008 | Schklair et al. | ............. | 348/47 |
| 2008/0309755 A1* | 12/2008 | Yoshida et al. | ............. | 348/51 |
| 2009/0102914 A1* | 4/2009 | Collar et al. | ............. | 348/46 |
| 2010/0231689 A1* | 9/2010 | Bruls et al. | ............. | 348/43 |
| 2011/0002594 A1* | 1/2011 | Kim et al. | ............. | 386/248 |

FOREIGN PATENT DOCUMENTS

| | | |
|---|---|---|
| EP | 1 501 316 | 1/2005 |
| EP | 1 548 648 | 6/2005 |
| EP | 1 739 979 | 1/2007 |
| JP | 2003-111101 | 4/2003 |
| JP | 2005-026800 | 1/2005 |
| KR | 1020050056070 | 6/2005 |
| KR | 100716142 | 5/2007 |
| WO | WO 2009/002115 | 12/2008 |

OTHER PUBLICATIONS

Hyun Lee et al., "A Structure for 2D/3D Mixed Service Based on Terrestrial DMB System", 2007 3DTV Conference, May 1, 2007.

* cited by examiner

*Primary Examiner* — Phuoc Nguyen
(74) *Attorney, Agent, or Firm* — The Farrell Law Firm, P.C.

(57) ABSTRACT

A method for controlling moving picture encoding using channel information of wireless networks is provided. By the method, it is possible to use a pre-verified standard technology in the prescription of a stereoscopic image file format, thereby simplifying a verification procedure for a new standard. Also, it is possible to use a new a stereoscopic image file format, thereby selecting, generating, and reproducing either of a 2D image file or a 3D stereoscopic image file. In particular, according to a system and a method for using a file format used to generate a 3D stereoscopic image, it is possible to reproduce and display a caption in the form of a 2D image during reproduction of the 3D stereoscopic image, thereby reducing eyestrain of a user, and additionally providing an image such as news, or an advertisement, to a user.

11 Claims, 9 Drawing Sheets

Mdat (230)

| FIRST IMAGE TRACK (231) | FIRST IMAGE DATA (232) |
| SECOND IMAGE TRACK (233) | SECOND IMAGE DATA (234) |
| THIRD IMAGE TRACK (235) | THIRD IMAGE DATA (236) |
| FIRST VOICE TRACK (237) | FIRST VOICE DATA (238) |
| SECOND VOICE TRACK (239a) | SECOND VOICE DATA (239b) |

Moov (210)
- INFORMATION OF FIRST IMAGE DATA WITHIN FIRST IMAGE TRACK (211)
- INFORMATION OF FIRST VOICE DATA WITHIN FIRST VOICE TRACK (212)

Meta (220)
- INFORMATION OF SECOND IMAGE DATA WITHIN SECOND IMAGE TRACK (221)
- INFORMATION OF THIRD IMAGE DATA WITHIN THIRD IMAGE TRACK (222)
- INFORMATION OF SECOND VOICE DATA WITHIN SECOND VOICE TRACK (223)

Ftyp

Ftyp

Moov (240)
- INFORMATION OF FIRST IMAGE DATA WITHIN IMAGE TRACK (241)
- INFORMATION OF FIRST VOICE DATA WITHIN VOICE TRACK (242)

Meta (250)
- INFORMATION OF SECOND IMAGE DATA WITHIN IMAGE TRACK (251)
- INFORMATION OF THIRD IMAGE DATA WITHIN IMAGE TRACK (252)
- INFORMATION OF SECOND VOICE DATA WITHIN VOICE TRACK (253)

Mdat (260)

| IMAGE TRACK (261) | FIRST IMAGE DATA (262) | SECOND IMAGE DATA (263) | THIRD IMAGE DATA (264) |
|---|---|---|---|
| VOICE TRACK (265) | FIRST VOICE DATA (266) | SECOND VOICE DATA (267) | |

FIG.2C

Ftyp

Moov (270)
- INFORMATION OF FIRST IMAGE DATA WITHIN IMAGE TRACK (271)
- INFORMATION OF FIRST VOICE DATA WITHIN VOICE TRACK (272)

Meta (280)
- INFORMATION OF SECOND IMAGE DATA WITHIN IMAGE TRACK (281)
- INFORMATION OF THIRD IMAGE DATA WITHIN IMAGE TRACK (282)
- INFORMATION OF SECOND VOICE DATA WITHIN VOICE TRACK (283)

Mdat (290)

IMAGE TRACK (291): 1 2 3 4 5 6 ... 1 2 3 4 5 6 (292)

VOICE TRACK (293): 1 2 1 2 ... 1 2 1 2 (294)

203

US 8,508,579 B2

SYSTEM AND METHOD FOR GENERATING AND REPRODUCING 3D STEREOSCOPIC IMAGE FILE INCLUDING 2D IMAGE

PRIORITY

This application claims priority under 35 U.S.C. §119(a) to an application entitled "System And Method For Generating And Reproducing 3D Stereoscopic Image File Including 2D Image" filed in the Korean Intellectual Property Office on Sep. 7, 2007 and assigned Serial No. 2007-90973, the contents of which are incorporated herein by reference.

BACKGROUND OF THE INVENTION

1. Field of the Invention

The present invention relates generally to a system and a method for generating and reproducing Three-Dimensional (3D) stereoscopic image files based on Two-Dimensional (2D) image media standards, and more particularly, to a system and a method for generating and reproducing a 2D image on a portion of a 3D stereoscopic image.

2. Description of the Related Art

Conventional standards for a file format used to store a 2D image have been known, whereas standards for a file format used to store a 3D stereoscopic image are not yet known.

In general, the Moving Picture Experts Group (MPEG), which is an international standardization organization related to multimedia, has been standardizing MPEG-2, MPEG-4, MPEG-7 and MPEG-21, since its first standardization of MPEG-1 in 1988. Since a variety of standards have been developed in this way, a need has arisen to generate one profile by combining different standard technologies. In response to this need, MPEG-A (MPEG Application: ISO/ICE 230000) multimedia application standardization activities have been carried out. In a Multimedia Application Format (MAF) that is one of MPEG-A activities, non-MPEG standards, as well as the conventional MPEG standards, are combined so that the utilization value of the standard can be enhanced. In this way, already verified standard technologies can be easily combined without any further efforts to set up a separate standard, thereby developing the MAF and maximizing the efficiency value thereof. The standardization, such as a Digital Multimedia Broadcasting MAF (DMB MAF), has been ongoing, but a file format for storing a 3D stereoscopic image has not yet been standardized.

According to recent technology for implementing a 3D stereoscopic image, it is possible to reproduce a stereoscopic image by only a portal terminal with a barrier LCD. However, technology for reproducing a 3D stereoscopic image by a general portable terminal or a storage format of a stereoscopic image therefor has never been known.

Meanwhile, when a caption is displayed during reproduction of a 3D stereoscopic image, a user views the caption of a 3D stereoscopic image, which may easily cause eyestrain for the user.

SUMMARY OF THE INVENTION

The present invention has been made to address at least the above problems and/or disadvantages and to provide at least the advantages described below. Accordingly, an aspect of the present invention provides a file format required to generate, store, and reproduce a 3D stereoscopic image. Particularly, the present invention provides a file format for a 3D stereoscopic image based on a file format used to generate, store, and reproduce an existing 2D image. Further, the present invention provides a system and a method for generating and reproducing a 3D stereoscopic image file using a file format for a 3D stereoscopic image.

Another aspect of the present invention provides a system and a method for generating and reproducing a 3D stereoscopic image file including a 2D image, which enables a user to view a caption of a 3D stereoscopic image in the form of a 2D image when a user views a 3D stereoscopic image. Further, the present invention provides a system and a method for providing an image, which include an advertisement broadcast or a news broadcast, in addition to a caption, in the form of a 2D image, on a part on a 3D stereoscopic image.

According to an aspect of the present invention, a system is provided for generating and reproducing a 3D stereoscopic image file including a 2D image. The system includes a stereoscopic image file generating apparatus for generating a stereoscopic image file including first image data, second image data used to generate a 3D stereoscopic image after being synchronized with the first image data, and third image data used to generate a 2D image. The system also includes a stereoscopic image file reproducing apparatus for reproducing and displaying the 3D stereoscopic image by synthesizing the first image data and the second image data, and for reproducing and displaying the 2D image generated from the third image data on a portion of the 3D stereoscopic image being reproduced, when the generated stereoscopic image file is input.

According to another aspect of the present invention, a system is provided for generating and reproducing a 3D stereoscopic image file including a 2D image. The system includes a stereoscopic image file generating apparatus for generating a stereoscopic image file, which includes a data area including first image data, second image data used to generate a 3D stereoscopic image after being synchronized with the first image data, and third image data used to generate a 2D image, a header area including information of the first image data, and a metadata area including information of the second image data and information of the third image data. The system also includes a stereoscopic image file reproducing apparatus for reproducing and displaying the 3D stereoscopic image by parsing the information of the first image data and the second image data and synthesizing the first image data and the second image data, and for parsing the information of the third image data, and then reproducing and displaying the 2D image generated from the third image data on a portion of the 3D stereoscopic image being reproduced, when the generated stereoscopic image file is input.

According to an additional aspect of the present invention, a method is provided for generating and reproducing a 3D stereoscopic image file including a 2D image. A predetermined subject is photographed from a first view and first image data is output, and the subject is photographed from a second view and second image data is output. The output first image data and second image data are pre-processed. The pre-processed first image data and second image data, and third image data are stored and used to generate a 2D image. The stored first image data and second image data, and the stored third image data are encoded. The stereoscopic image file including the encoded first image data and second image data, and the encoded third image data is generated.

According to another aspect of the present invention, a stereoscopic video application format in a stereoscopic video reproduction apparatus is provided. The format includes a media data box (mdat) area including a first image and a second image used to generate a 3D stereoscopic image, and a 2D image. The format also includes a moviebox (moov) area including first image information. The format further includes a metabox (meta) area including second image information, and 2D image information used to display the 2D image in a portion of the 3D stereoscopic image.

According to a further aspect of the present invention, a stereoscopic video reproduction apparatus is provided. The apparatus includes a file parsing unit for parsing stereoscopic video application data, thereby extracting a first image and a second image used to generate a 3D stereoscopic image, and extracting a 2D image, when the stereoscopic video application data with the 2D image is received. The apparatus also includes a decoding unit for decoding the extracted first and second images, and the extracted 2D image. The apparatus further includes a reproducing unit for reproducing the 3D stereoscopic image obtained by synthesizing the decoded first image and second image through first image information and second image information, and for reproducing the 2D image in a portion of the reproduced 3D stereoscopic image by using 2D image information. Additionally, the apparatus includes a display unit for displaying the reproduced 3D stereoscopic image, and for displaying the reproduced 2D image in a portion of the displayed 3D stereoscopic image.

According to another aspect of the present invention, a method is provided for reproducing stereoscopic video in a stereoscopic video reproduction apparatus. Stereoscopic video application data is parsed when the stereoscopic video application data with a 2D image is received. A first image and a second image used to generate a 3D stereoscopic image are extracted from the parsed stereoscopic video application data, and the 2D image is extracted. The extracted first and second images, and the extracted 2D image are decoded. The 3D stereoscopic image obtained by synthesizing the decoded first image and second image through first image information and second image information is reproduced, and the 2D image is reproduced in a portion of the reproduced 3D stereoscopic image by using 2D image information. The reproduced 3D stereoscopic image is displayed, and the reproduced 2D image is displayed in a portion of the displayed 3D stereoscopic image.

BRIEF DESCRIPTION OF THE DRAWINGS

The above and other aspects, features and advantages of the present invention will be more apparent from the following detailed description when taken in conjunction with the accompanying drawings, in which:

FIG. 2A is a diagram illustrating a storage format of a 3D stereoscopic image file according to a first embodiment of the present invention;

FIG. 2B is a diagram illustrating a storage format of a 3D stereoscopic image file according to a second embodiment of the present invention;

FIG. 2C is a diagram illustrating a storage format of a 3D stereoscopic image file according to a third embodiment of the present invention;

DETAILED DESCRIPTION OF THE PREFERRED EMBODIMENTS

Figure 1:
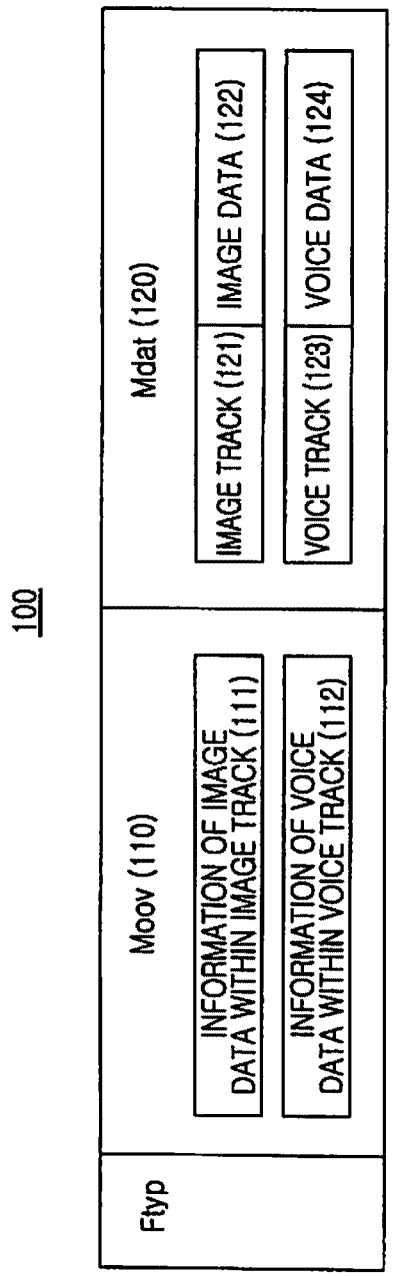
FIG. 1 is a diagram illustrating a storage format of a conventional International Standardization Organization (ISO) 14496-12 based 2D image file.

Preferred embodiments of the present invention are described in detail with reference to the accompanying drawings. Similar component are designated by similar reference numerals although they are illustrated in different drawings. Detailed descriptions of constructions or processes known in the art may be omitted to avoid obscuring the subject matter of the present invention.

Before describing a format for storing a 3D stereoscopic image according to the present invention, a storage format of a conventional ISO based 2D image file will be described with reference to FIG. 1. FIG. 1 is a diagram illustrating a conventional ISO 14496-12 based 2D image file format 100. Referring to FIG. 1, the 2D image file format 100 includes a moviebox (moov) area 110 and an mediadatabox (mdat) area 120. The mdat area 120 is a data area of the file format, and includes actual image data within an image track 121, and audio data within a audio track 123. Each of the tracks includes the image data 122 and audio data 124 stored in a frame unit. The moov area 110 is a header area of the file format and has an object based structure. The moov area 110 includes all pieces of information used to reproduce a file, including content information, such as a frame rate, a bit rate, image size, etc., and synchronization information used to support a reproduction function of FF/REW. In particular, the moov area 110 includes information, such as the number of frames within the image data 111 and audio data 112, and a size of each frame, etc. Therefore, it is possible to restore and reproduce image data and audio data by parsing the moov area during reproduction.

The storage format of a 3D stereoscopic image file including a 2D image according to one embodiment of the present invention will be described with reference to FIGS. 2A-2C. In the present invention, 3D stereoscopic image files 201 to 203 are constructed by basically adding only a metabox (meta) area to the 2D image file format 100 shown in FIG. 1. Therefore, without important modification in a structure and a function of a 2D image file format, it is possible to use the function thereof.

An example of one embodiment of the present invention will be described with reference to FIG. 2A. FIG. 2A is a diagram illustrating a storage format of a 3D stereoscopic image file including a 2D image according to a first embodiment of the present invention. An mdat area 230 corresponding to a data area includes a first image track 231, a second image track 233, a third image track 235, a first audio track 237, and a second audio track 239a. The first image track 231 includes first image data 232, and the second image track 233 includes second image data 234. Herein, the first image data 232 and the second image data 234 are data generated by utilizing human visual characteristics, and are data generated by photographing a predetermined subject from a left view and a right view by using two cameras. As such, by generating and reproducing a separated image on left and right eyes of a user, the user can view an image displayed in a stereoscopic manner. When only one of the first image data 232 and the second image data 234 is reproduced, the user can view a 2D image. When the first image data 232 and the second image data 234 are reproduced by being synthesized, the user can view a 3D stereoscopic image. First audio data 238 within the first image track 237 is data regarding a audio, which is to be added to a 3D stereoscopic image. Meanwhile, the third image track 235 includes third image data 236, which corresponds to a characteristic of the present invention, and the second audio track 239a includes a second audio data 239b. Herein, the second audio track 239a and the second audio data 239b are used to reproduce and display a 2D image on a portion of the 3D stereoscopic image.

Figure 3:
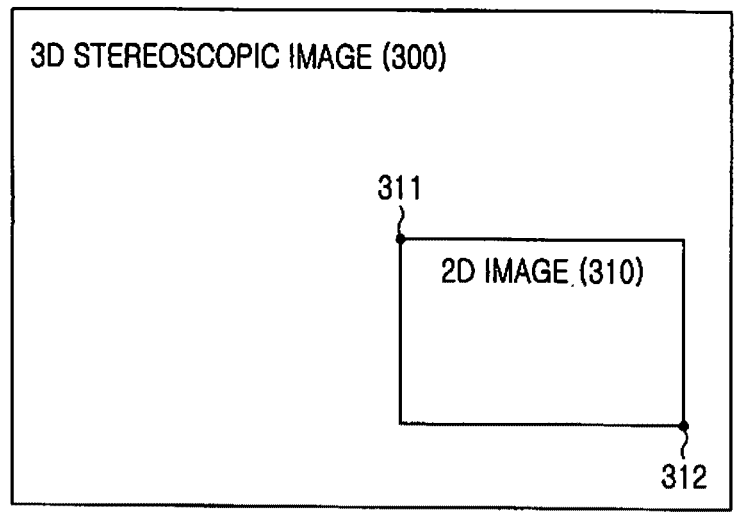
FIG. 3 is a conceptual diagram illustrating a 2D image displayed on a portion of a 3D stereoscopic image according to one embodiment of the present invention.

Such a conception of displaying a 2D image on a portion of a 3D stereoscopic image is shown in FIG. 3. In other words, FIG. 3 shows that a 2D image 310 is separately reproduced and displayed on a portion of the 3D stereoscopic image 300. For example, when a user views a caption of a 3D stereoscopic image, letters of the caption are also displayed in three dimensions, which causes severe eyestrain to the user. Therefore, the caption should be displayed in the format of a 2D image.

Figure 4A:
FIG. 4A is a view in which news of a 2D image is reproduced and displayed on a portion of a 3D stereoscopic image according to a first embodiment of the present invention.
Figure 4B:
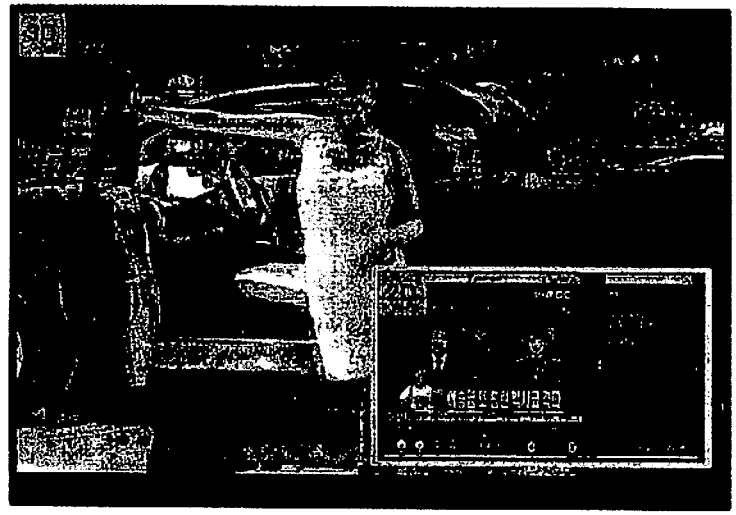
FIG. 4B is a view in which a caption of a 2D image is reproduced and displayed on a portion of a 3D stereoscopic image according to a second embodiment of the present invention.
Figure 4C:
FIG. 4C is a view in which an advertisement of a 2D image is reproduced and displayed on a portion of a 3D stereoscopic image according to a third embodiment of the present invention.

FIG. 4A is an exemplary view in which a caption of a 2D image is reproduced and displayed on a portion of a 3D stereoscopic image. Meanwhile, it is possible to reproduce and display additional images, such as news, or advertisements, as sub-images displayed in the form of a 2D image, which is illustrated in FIGS. 4B and 4C.

Second audio data 239b is data regarding a audio added to the 2D image 310. When the 2D image 310 corresponds to a caption, the second audio data 239b may be skipped. Next, the moov area corresponding to a header area includes information 211 of first image data and information 212 of first audio data, and the meta 220 includes information 221 of second image data, information 222 of third image data, and information 223 of second audio data. Such information includes information about the number of total frames within each data, and a size of the frames, so that, when a 3D stereoscopic image 300 of FIG. 3 is reproduced, it is possible to parse such information and synthesize respective data. In order to generate the 3D stereoscopic image 300, the first image data 232 and the second image data 234 are respectively synthesized, and then the first audio data 238 is added to the synthesized image data. Meanwhile, the information 222 of the third image data is data used to generate the 2D image 310. Since the 2D image 310 is reproduced and displayed on a portion of the 3D stereoscopic image 300, the information 222 of the third image data includes information regarding a location and a size where the 2D image 310 is reproduced and displayed on the 3D stereoscopic image 300, regarding a time when the 2D image 310 begins to be reproduced and displayed on the 3D stereoscopic image 300, regarding a time during which the 2D image 310 is being reproduced and displayed, and regarding a time at which reproduction and display of the 2D image 310 is terminated. For example, information regarding a location at which the 2D image 310 is reproduced and displayed may be set by designating an upper-left-end vertex coordinate 311 and lower-right-end vertex coordinate 312, as shown in FIG. 3. Meanwhile, the information 223 of the second audio data may be various types of information that are set to add the second audio data 239b to the 2D image 310. When the 2D image 310 corresponds to a caption, the information 223 of the second audio data may be skipped.

A second embodiment of the present invention is described with reference to FIG. 2B. FIG. 2B is a diagram illustrating a storage format of a 3D stereoscopic image file according to a second embodiment of the present invention. The storage format of the 3D stereoscopic image file 202 of the present invention includes an mdat area 260 corresponding to a data area, a moov area 240 corresponding to a header area, and a meta area 250. The difference between the storage format of the 3D stereoscopic image file 202 and the storage format of the 3D stereoscopic image file 201 lies in that the storage format of the 3D stereoscopic image file 202 includes one image track 261 containing all of the first image data 262, the second image data 263, and the third image data 264. The storage scheme is a scheme for storing one from among the first image data 262, the second image data 263, and the third image data 264 in a predetermined order. Therefore, it is possible to construct image data with only one track. It is also possible to construct the first audio data 265, the second audio data 266, and the third audio data 267 with one audio track.

The moov area 240 includes the information 241 of the first image data and the information 242 of the first audio data. Meanwhile, the meta area 250 includes information 251 of the second image data, information 252 of the third image data, and the information 253 of the second audio data. Each information includes the number of total frames within each data, a size of the frames, and a starting address pointing to the location where each data is stored in a corresponding track. Therefore, it is possible to reproduce the 3D stereoscopic image 300 by synthesizing the first image data 262 and the second image data 263. The information 252 of the third image data includes a location and a size where the 2D image 310 is reproduced and displayed on the 3D stereoscopic image 300, a time at which the 2D image 310 is reproduced and displayed, a time during which the 2D image 310 is reproduced and displayed, and a time when the reproduction and display of the 2D image 310 is terminated. In this way, it is possible to reproduce and display the 2D image 310, generated from the third image data 264, on a portion of the 3D stereoscopic image 300.

A third embodiment of the present invention is described with reference to FIG. 2C. FIG. 2C is a diagram illustrating a storage format of a 3D stereoscopic image file according to a third embodiment of the present invention. The storage format 203 of the 3D stereoscopic image file according to the present invention also includes an mdat area 290 corresponding to a data area, a moov area 270 corresponding to a header area, and a meta area 280. The storage format shown in FIG. 2C includes one image track 291, as in the case of the storage format of the 3D stereoscopic image file 202 of FIG. 2b, and is different in that the storage format of FIG. 2C includes one image track 291 in which the first image data, the second image data, and the third image data 292 are stored by turns. Further, the storage format of FIG. 2C includes one audio track 293, and is different in that first audio data and second audio data are also stored in one audio track 293, as indicated by reference numeral 294. The moov area 270 corresponding to the header area includes information 271 of first image data and information 272 of first audio data, and the meta area 280 includes information 281 of second image data, information 282 of third image data, and information 283 of second audio data, each including the number of total frames of each data, a size of the frames, and a starting address pointing to the location where each data is stored in a corresponding track.

Meanwhile, unlike the 3D stereoscopic image file 202, the 3D stereoscopic image file 203 further includes an offset indicating the displacement from data within each track until a next corresponding data.

The information 282 of the third image data further includes a location and a size where the 2D image 310 is reproduced and displayed on the 3D stereoscopic image 300, a time when the 2D image 310 begins to be reproduced and displayed on the 3D stereoscopic image 300, a time during which the 2D image 310 is being reproduced and displayed on the 3D stereoscopic image 300, and a time when the reproduction and display of the 2D image 310 on the 3D stereoscopic image 300 is terminated, all of which are used to reproduce and display the 2D image 310 generated from the third image data on a portion of the 3D stereoscopic image 300.

Standards regarding information requiring reproduction and display of the 2D image 310 on a portion of the 3D stereoscopic image 300 are proposed below.

---

[Definition]
Box Type: 'sp2i'
Container: Sample Table Box('stbl')
mandatory: Yes
Quantity: Zero or one
[Syntax]
aligned(8) class StereoscopicPartial2DInformationBox extends FullBox('sp2i',
version=0, 0)
{
    unsigned int(16) top_left_x;
    unsigned int(16) top_left_y;
    unsigned int(16) bottom_right_x;
    unsigned int(16) bottom_right_y;
    unsigned int(32) timescale;
    unsigned int(32) duration;
    unsigned int(32) start_time;
}
[Semantics]
top_left_x: top_left_x location at which partial monoscopic contents are reproduced
top_left_y: top_left_y location at which partial monoscopic contents are reproduced
bottom_right_x: bottom_right_x location at which partial monoscopic contents are reproduced
bottom_right_y: bottom_right_y location at which partial monoscopic contents are reproduced
timescale: timescale for presentation of monoscopic contents
duration: duration for presentation of monoscopic contents
start_time: value indicating a time interval from the starting of reproduction of stereoscopic contents to the starting of reproduction of monoscopic contents (second unit)

---

A system for generating and reproducing a stereoscopic image file using 3D stereoscopic image files 201 to 202 shown in FIGS. 2A to 2C are described. Such a system may broadly include a stereoscopic image file generating apparatus and a stereoscopic image file reproducing apparatus. First, the stereoscopic image file generating apparatus according to one embodiment of the present invention is described with reference to FIG. 5.

The stereoscopic image file generating apparatus 500 includes a first camera 510, a second camera 511, an image signal processing unit 520, a storage unit 530, an encoding unit 540, and a file generating unit 550.

The first camera 510 photographs a predetermined subject from a left view or a right view, and then outputs first image data, and the second camera 511 photographs the subject from a view different from that of the first camera 510 and then outputs second image data.

The first image data and the second image data output from each of the first camera 510 and the second camera 511 are pre-processed by the image signal processing unit 520. Herein, the pre-processing performed by the video signal processing unit 520 means conversion of an external image value, i.e., light and color components, that is an analog value recognized by a Charge Coupled Device (CCD) or a Complimentary Metal-Oxide Semiconductor (CMOS) type sensor, into a digital value.

Figure 5:
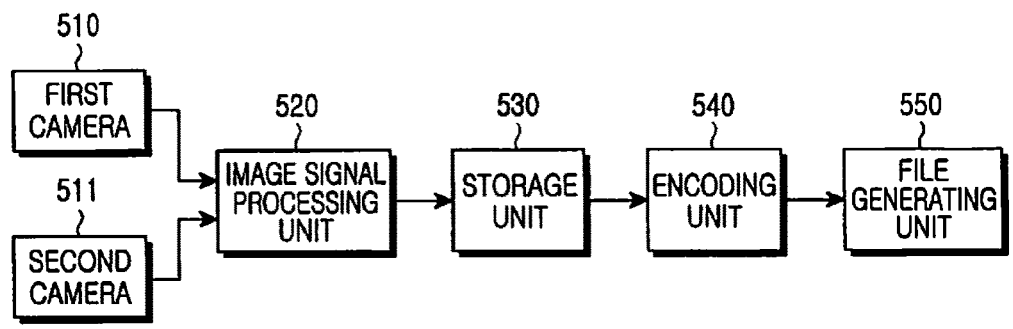
FIG. 5 is a block diagram illustrating a construction of a stereoscopic image file generating apparatus according to an embodiment of the present invention.

The storage unit 530 stores the first image data and the second image data pre-processed by the image signal processing unit 520 and provides the stored image data to the encoding unit 540. The storage unit 530 also pre-stores third image data for generation of the 2D image 310. In this case, the third image may be data for additional images, such as a caption, news, advertisements, etc. Although FIG. 5 illustrates the storage unit 530, it does not separately show a storage construction for buffering between the elements shown in FIG. 5. The encoding unit 540 encodes the first image data, the second image data, and the third image data provided from the storage unit 530. The encoding operation performed by the encoding unit 540 includes encoding of data, which can be skipped as necessary.

The file generating unit 550 generates 3D stereoscopic image files 201 to 203 by using the first image data, the second image data, and the third image data encoded by the encoding unit 540. The first image data, the second image data, and the third image data are stored in an mdat area (i.e. a data area), information used to synthesize the first image data and the second image data for generation of the 3D stereoscopic image 300 is stored in the moov area (i.e. header area), and information used to generate the 2D image 310 from the third image data for reproduction and display of the generated 2D image 310 on a portion of the 3D stereoscopic image 300 is stored in a meta area. The generated stereoscopic image files 201 to 203 are input and transmitted to the stereoscopic image file reproducing apparatus, and then the stereoscopic image file reproducing apparatus generates and reproduces the 3D stereoscopic image 300 from the 3D stereoscopic image files 201 to 203. Hereinafter, the stereoscopic image file reproducing apparatus will be described.

Figure 6:
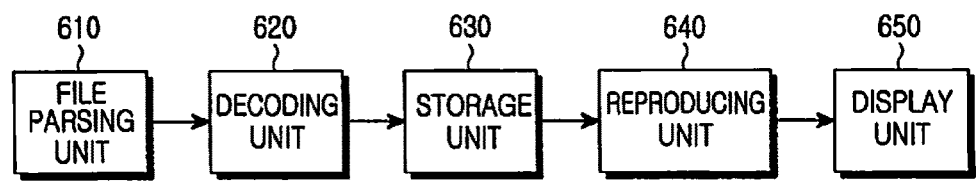
FIG. 6 is a block diagram illustrating a construction of a stereoscopic image file reproducing apparatus according to an embodiment of the present invention.

FIG. 6 is a block diagram illustrating a construction of a stereoscopic image file reproducing apparatus according to one embodiment of the present invention. Referring to FIG. 6, the stereoscopic image file reproducing apparatus 600 includes a file parsing unit 610, a decoding unit 620, a storage unit 630, a reproducing unit 640, and a display unit 650.

The file parsing unit 610 receives and parses the 3D stereoscopic image file generated by the file generating unit 550 of the stereoscopic image file generating apparatus 500. The file parsing unit 610 parses information of first image data, information of second image data, and information of third image data stored respectively in the moov area and the meta area, and then extracts the first image data, the second image data, and the third image data stored in the mdat area.

The decoding unit 620 decodes the extracted first image data, second image data, and third image data, which is preformed in the case where the stereoscopic image file generating apparatus 500 uses the encoding unit 540 to perform encoding. Then, decoded data is stored in the storage unit 630. The reproducing unit 640 makes reference to the information of the first image data and the information of the second image data, and reproduces the 3D stereoscopic image 300 obtained by synthesizing the first image data and the second image data stored in the storage unit 630. Then, the display unit 650 displays the reproduced 3D stereoscopic image 300. Herein, the reproducing unit 640 reproduces the 3D stereoscopic image 300 together with the 2D image 310, which is obtained by making reference to the information of the third image data to generate and reproduce the 2D image 310. Then, the display unit 650 displays the 2D image 310 on a portion of the 3D stereoscopic image 300.

Next, a method for generating and reproducing a stereoscopic image file by using such a 3D stereoscopic image file format is described.

Figure 7:
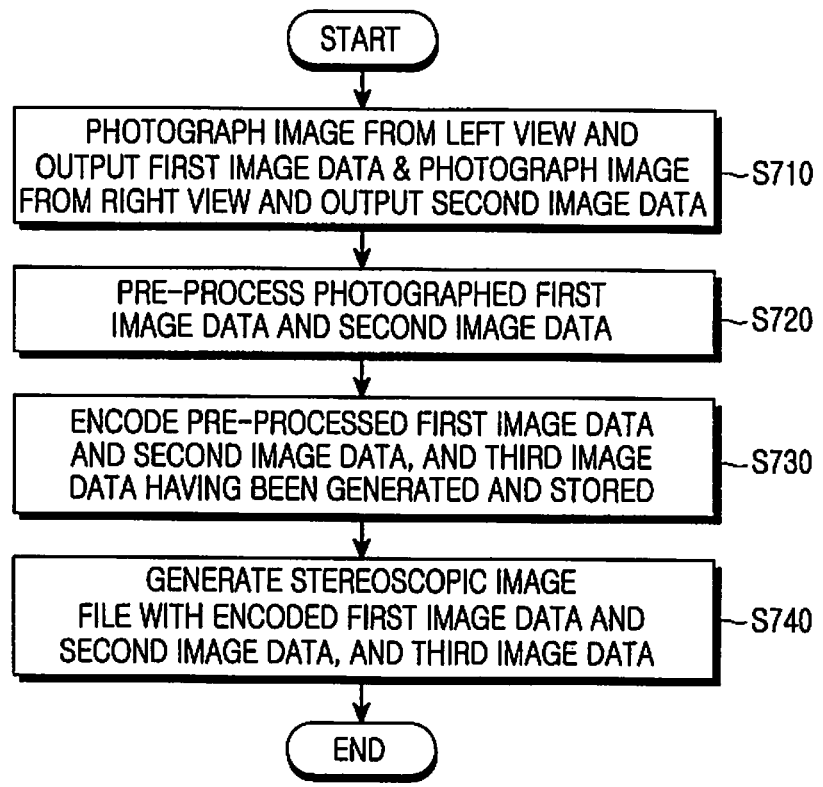
FIG. 7 is a flowchart illustrating a method for generating a stereoscopic image file according to an embodiment of the present invention.

FIG. 7 is a flowchart illustrating a method for generating a stereoscopic image file according to one embodiment of the present invention. Referring to FIG. 5, the method includes a photographing step (S710), a pre-processing step (S720), an encoding step (S730), and a file generating step (S740).

In step S710, a predetermined subject is photographed from a left view or a right view, and first image data is output. Then, the subject is photographed from another view and second image data is output.

In step S720, the first image data and the second image data are pre-processed, and converted into digital signals from analog signals recognized by the CCD or CMOS type sensor.

In step S730, the first image data, the second image data, and the third image data stored in the storage unit 530 are encoded. Step S730 can be skipped if necessary.

In step S740, a 3D stereoscopic image file is generated using the first image data and the second image data having been encoded in the encoding unit 540. The 3D stereoscopic image file may be generated as described in FIGS. 2A to 2C.

Figure 8:
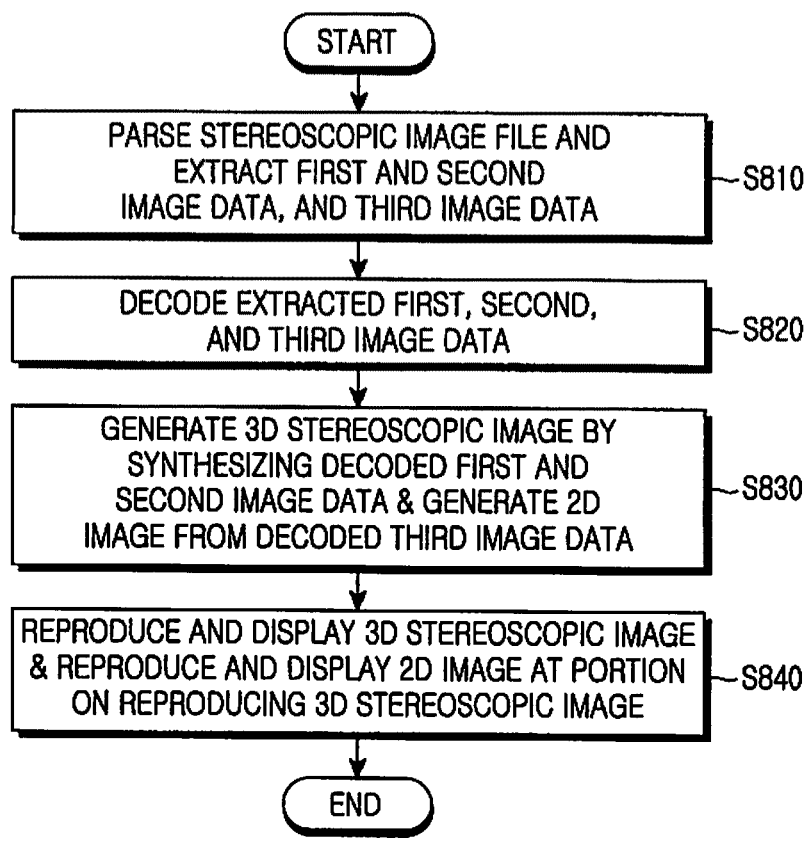
FIG. 8 is a flowchart illustrating a method for reproducing a stereoscopic image file according to an embodiment of the present invention.

FIG. 8 is a flowchart illustrating a method for reproducing a stereoscopic image file according to an embodiment of the present invention. Referring to FIG. 8, the method for reproducing the stereoscopic image file includes a file parsing step (S810), a decoding step (S820), an image generating step (S830), and a reproducing and display step (S840). FIG. 8 illustrates a method for reproducing the stereoscopic image file generated in FIG. 7.

In step S810, first image data, second image data, and third image data are extracted using information of first image data, information of second image data, and information of third image data stored in either of the moov area or the meta area of the stereoscopic image file.

In step S820, the first image data, the second image data, and the third image data are decoded. When the decoding step (S730) is skipped in the method for generating the stereoscopic image file, the decoding step (S820) is also skipped.

In step S830, the 3D stereoscopic image 300 is generated by synthesizing the first image data and the second image data decoded in step S820. The 2D image 310 is generated from the third image data. In step S840, the 3D stereoscopic image 300 generated in the above-described generating step is reproduced and displayed on the display unit 650 and the 2D image 310 is reproduced and displayed on a portion of the 3D stereoscopic image 300. Such a display unit 650 can perform reproduction, even in a general Liquid Crystal Display (LCD).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A stereoscopic video application in a stereoscopic video reproduction apparatus, the application being embedded in a non-transitory computer-readable medium and comprising:

a media data box (mdat) area including a first image and a second image used to generate a Three-Dimensional (3D) stereoscopic image, and a Two-Dimensional (2D) image;

a moviebox (moov) area including first image information;

a metabox (meta) area including second image information, and 2D image information used to display the 2D image in a portion of the 3D stereoscopic image, wherein the 2D image information comprises a reproduction location, a reproduction start time, a reproduction duration time, and a reproduction end time of the 2D image, used for reproduction in a portion of the 3D stereoscopic image.

2. The application as claimed in claim 1, wherein the moov area further comprises first audio data information corresponding to the first image.

3. The application as claimed in claim 1, wherein the meta area further comprises second audio data information corresponding to the second image.

4. The application as claimed in claim 1, wherein the first image corresponds to an image, which is generated by photographing from a left view, from among images photographed by two cameras, and the second image corresponds to an image, which is generated by photographing from a right view, from among images photographed by the two cameras.

5. The application as claimed in claim 4, wherein the first image information or the second image information comprises a number of frames within the first image or the second image, and a size of the frames.

6. A stereoscopic video reproduction apparatus, the apparatus comprising:

a file parsing unit for parsing stereoscopic video application data, thereby extracting a first image and a second image used to generate a Three-Dimensional (3D) stereoscopic image, and extracting a 2D image, when the stereoscopic video application data with the Two-Dimensional (2D) image is received;

a decoding unit for decoding the extracted first and second images, and the extracted 2D image;

a reproducing unit for reproducing the 3D stereoscopic image obtained by synthesizing the decoded first image and second image through first image information and second image information, and for reproducing the 2D image in a portion of the reproduced 3D stereoscopic image by using 2D image information; and a display unit for displaying the reproduced 3D stereoscopic image, and for displaying the reproduced 2D image in a portion of the displayed 3D stereoscopic image, wherein the 2D image information comprises a reproduction location, a reproduction start time, a reproduction duration time, and a reproduction end time of the 2D image, used for reproduction in a portion of the 3D stereoscopic image.

7. The apparatus as claimed in claim 6, wherein the first image corresponds to an image, which is generated by photographing from a left view, from among images photographed by two cameras, and the second image corresponds to an image, which is generated by photographing from a right view, from among images photographed by the two cameras.

8. The apparatus as claimed in claim 6, wherein the first image information or the second image information comprises a number of frames within the first image or the second image, and a size of the frames.

9. A method for reproducing stereoscopic video in a stereoscopic video reproduction apparatus, the method comprising the steps of:

parsing stereoscopic video application data when the stereoscopic video application data with a Two-Dimensional (2D) image is received;

extracting a first image and a second image used to generate a Three-Dimensional (3D) stereoscopic image from the parsed stereoscopic video application data, and extracting the 2D image;

decoding the extracted first and second images, and the extracted 2D image;

reproducing the 3D stereoscopic image obtained by synthesizing the decoded first image and second image through first image information and second image information, and reproducing the 2D image in a portion of the reproduced 3D stereoscopic image by using 2D image information;

displaying the reproduced 3D stereoscopic image, and displaying the reproduced 2D image in a portion of the displayed 3D stereoscopic image, wherein the information of the 2D image comprises a reproduction location, a reproduction start time, a reproduction duration time, and a reproduction end time of the 2D image, used for reproduction in a portion of the 3D stereoscopic image.

10. The method as claimed in claim 9, wherein the first image corresponds to an image, which is generated by photographing from a left view, from among images photographed by two cameras, and the second image corresponds to an image, which is generated by photographing from a right view from among images photographed by the two cameras.

11. The method as claimed in claim 9, wherein the first image information and the second image information comprises a number of frames within the first image or the second image, and a size of the frames.

* * * * *